Oct. 8, 1968   R. R. BALAGUER   3,405,013
METHOD OF FORMING A BATTERY CUP
Filed May 24, 1966
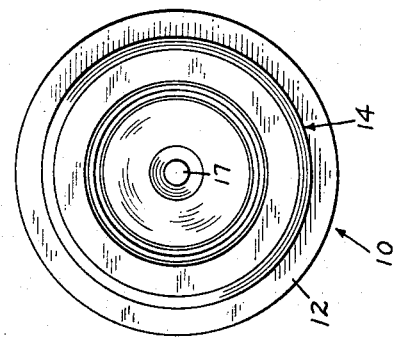
FIG.4.
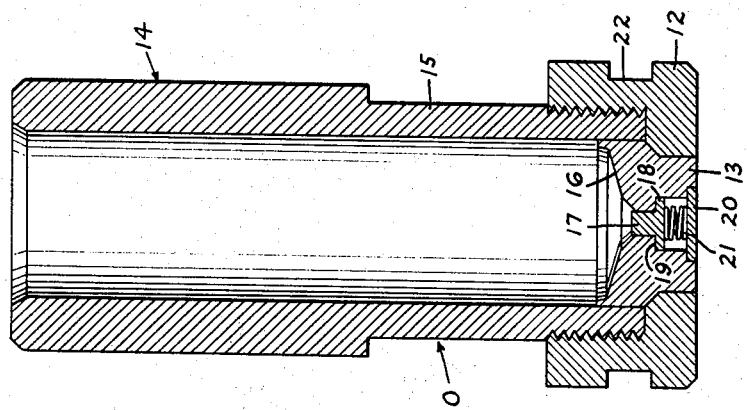
FIG.3.
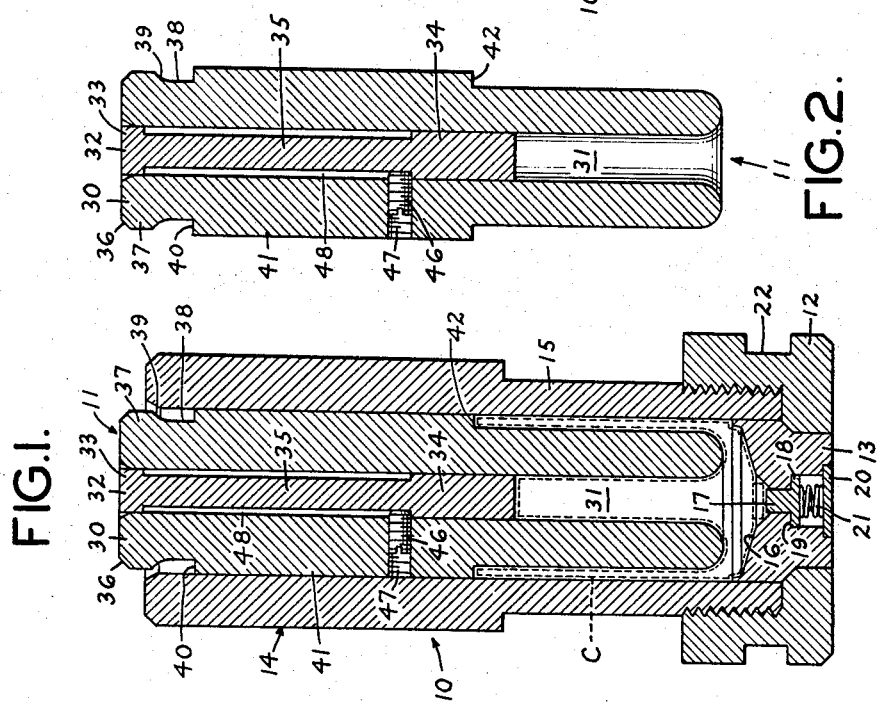
FIG.2.
FIG.1.

United States Patent Office 3,405,013
Patented Oct. 8, 1968

3,405,013
METHOD OF FORMING A BATTERY CUP
Rodolfo Rodriguez Balaguer, Fort Lauderdale, Fla., assignor to Patent Holding Corporation, Fort Lauderdale, Fla., a corporation of Florida
Filed May 24, 1966, Ser. No. 552,478
7 Claims. (Cl. 136—122)

ABSTRACT OF THE DISCLOSURE

A molding method in which a quantity of carbonaceous molding powder is charged into a hollow mold element and a piston element is inserted in the mold and into contact with the molding powder to apply a molding pressure to the powder. One, but not both, of the mold and piston elements is heated, prior to the insertion of the piston element into the mold, to a temperature sufficient for the heat content of the heated element, when transferred to the powder, to soften the powder for conversion thereof to a green carbon state. The piston element is maintained in contact with the powder under a molding pressure to convert the powder to a green carbon state. The piston and mold elements are then cooled and separated and the molded cup is removed therefrom.

---

The present invention relates to a molding method and more particularly to a molding method for molding thin-walled green carbon cups and the like.

In R. R. Balaguer United States Patent 2,903,499, granted Sept. 8, 1959, there is described and claimed a primary battery construction in which the carbon cathode structure comprises a thin-walled self-supporting green carbon cup with a center carbon rod projecting from the base of the cup. There is also described in that patent a molding method and a molding apparatus for making such cathode structures.

The commercial manufacture of dry cell batteries requires that they be made in high speed repetitive operations. In making the cathode cup of the aforementioned patent, considerable difficulty has been encountered in achieving a satisfactory high speed repetitive molding operation suitable for commercial production. And various factors have resulted in numerous rejects and equipment failures when performing the molding operation in a modern high speed molding press.

An improved molding apparatus for making the cathode cup of the aforementioned patent is described and claimed in R. R. Balaguer United States Patent 3,226,772, granted Jan. 4, 1966. While the apparatus of the last mentioned patent has been found useful and efficient in the manufacture of such products, it has not completely eliminated certain problems such as occasional sticking of carbon cups to the molding piston and metallic particle contamination of the cup surfaces. This latter problem apparently arises from arcing occurring when using a copper or copper alloy piston and is especially troublesome with the high heating rates needed for high speed production.

The principal object of the present invention has been the provision of a novel and improved molding method for making thin-walled, green carbon cathode cups and the like.

More particularly it has been an object of the invention to provide such a method which permits efficient, economical and reliable production of such products and which minimizes rejects.

Another object of the invention has been the provision of such a method which minimizes or eliminates metallic particle contamination of carbon cup surfaces.

Other and further objects, features and advantages of the invention will appear more fully from the following description of the invention taken in connection with the appended drawing, in which:

FIG. 1 is a longitudinal sectional view of an assembled mold and piston suitable for use in carrying out the method of the invention;

FIG. 2 is an enlarged longitudinal sectional view of the piston of FIG. 1;

FIG. 3 is a longitudinal sectional view of the mold of FIG. 1; and

FIG. 4 is a top plan view of the mold of FIG. 3.

Referring now to the drawings, the molding apparatus comprises a mold 10 and a piston 11 adapted to be inserted in and slide axially within mold 10.

The mold 10 comprises an annular base 12, an annular socket 13 which fits into a correspondingly shaped opening in the inside bottom of base 12, and a hollow cylindrical body 14. A lower portion 15 of body 14 has external threads at the lower end thereof which engage internal threads in base 12 to hold body 14 and base 12 in assembled relationship. The internal surface of the lower end of body 14 fits snugly but slidably against the adjacent outer side surface of socket 13. The upper end of socket 13 is provided with an opening 16 which is shaped to receive a metal end cap closure for a dry cell battery, e.g., a D-size cell.

The central hole in socket 13 is closed by a removable metal plug 17 having a radial flange 18 which seats against an internal shoulder 19 in socket 13. The lower end of plug 17 extends to a point just above the upper surface of a metal closure plate 20 which closes the bottom end of the central hole in socket 13. A coil spring 21 is wound around the lower end of plug 17 and acts against the upper surface of plate 20 and the lower surface of flange 19. Spring 21 urges plug 17 into the position shown but permits the plug to be pushed downward during the molding operation until the upper edge thereof is flush with the bottom of opening 16 and the lower edge thereof contacts plate 20. During operation the plate 20 will be held against the molding pressure by contact with the adjacent press platen.

A circumferential slot 22 in the outer surface of base 12 is provided for holding the mold 10 in a suitable press structure (not shown) and which in its simplest form would be of the type shown in the aforementioned Balaguer Patent 2,903,499, i.e., simply a pair of opposed press platen for applying molding pressure.

The piston 11 is slidable from a position completely outside the mold 10 to the position shown in FIG. 1. The piston 11 comprises an annular body 30 having a circular axially extending central space 31 within which is slidably mounted a cup ejecting pin 32. Upper and lower ends 33 and 34, respectively, of pin 32 have a close sliding fit with the walls of space 31. Ends 33 and 34 are separated by a reduced diameter portion 35 which has a substantial clearance from the walls of space 31, e.g., 1/16".

The upper end of piston body 30 is chamfered, as shown at 36. As shown in FIG. 1, an upper portion 37 of piston body 30 has a clearance from the internal walls of mold 10. The piston body 30 is provided with an annular groove 38 for clamping purposes to permit ejection of the molded cup by action of ejecting pin 32. The upper end of groove 38 is curved, as shown at 39, while the lower end thereof is a sharp shoulder, as shown at 40.

The shoulder 40 forms the upper end of a cylindrical portion 41 of the piston. The lower end of portion 41 is a sharp annular shoulder 42.

The axial location of shoulder 42 relative to the bottom end of piston body 30 is selected so that this distance represents the height of the cup wall, e.g., 1.97". The thickness of the cup wall is the same as the radial extent of shoulder 42 and typically might be 3/32", 1/16" or 1/32".

A screw 46 is threaded into a hole 47 extending through piston body 30. The screw 46 extends into an annular space 48 between portion 35 of pin 32 and the internal walls of piston body 30. Contact between the lower portion or head 34 of pin 32 and screw 46 determines the uppermost position of pin 35 and hence sets the height of the cup center rod which is formed in the space 31 below head 34.

In operation, the piston 11 is withdrawn from the mold 10 and a metal end cap is inserted into the recess 16. The charge of carbonaceous molding powder is inserted in the mold and the piston 11 is heated and then is inserted into the mold to heat and compress the powder and cause it to fill the space between the walls of the mold and the walls of the piston.

The piston 11 is preferably heated to a temperature of about 500° F. before being inserted in the mold. In general the piston temperature should be above about 350° F. and should be below about 700° F. The heated piston contacting the mix serves to soften the carbonaceous mix and to cause a molded green carbon to be formed when molding pressure is applied to the piston. Piston temperatures of 350° F. and below do not produce adequate heating of the mix and do not yield a strongly bonded green carbon. Temperatures much above 500° F. tend to soften the mix too much, and where the piston temperature is about 700° F. or higher the mix tends to stick to the mold wall and to leak past the end of the piston.

The molding pressure should be applied as soon as possible after the piston contacts the mix in the mold. The molding pressure is preferably about 15,000 p.s.i., but may lie in the range of about 10,000 to 50,000 p.s.i. The molding pressures referred to are measured adjacent the cup base. The molding pressure should be maintained for about 20 to 30 seconds. If desired, a clamping arrangement may be provided to maintain the piston in pressure contact with the mix after the press pressure is released. In this way the press time may be greatly reduced so that the hydraulic press can be used more efficiently.

After the molding pressure period is over the molding pressure is released and the mold, piston and contents are allowed to cool. Cooling may be accelerated, as with a cooling water bath or spray. After cooling, preferably to about room temperature, the piston is withdrawn from the mold. The green carbon cup, indicated by the dashed lines C in FIG. 1, will be held on the piston. The cup may be removed from the piston by pressing down on cup ejecting pin 32, as with a suitable hydraulic or mechanical force.

The carbonaceous molding powder or mix which is charged into mold 10 may be of any suitable type, e.g., those described in the aforementioned Balaguer Patent 2,903,499. A particularly desirable molding powder for the purpose of the invention is the one described and claimed in R. R. Balaguer Patent 3,196,025, granted July 20, 1965.

A specific example of a suitable carbonaceous molding powder or mix referred to in Patent 2,903,499 is a mixture consisting of 5% carbon black, 23% coal tar pitch (M.P. 105° C.) and 72% electric furnace graphite (scrap electrode material). A specific example of a suitable carbonaceous molding powder or mix as described in Patent 3,196,025 is a final mix formed by combining about 15 to 80% by weight of a basic mix with about 20 to 85% by weight of graphite or calcined petroleum coke. The final mix is then comminuted in a suitable mill, grinder or other device, preferably to a fineness at which about 80% will pass a 200 mesh screen. The basic mix referred to is formed by combining about 30 to 70% by weight of a binder material, e.g., coal tar pitch, and about 30 to 70% by weight of carbon black with the combined materials being heated to a temperature at least equal to and preferably slightly above the melting point of the binder material but below the temperature at which substantial volatile matter is evolved from the mix. The basic mix is then broken into fragments in a mill, grinder or other suitable device. Preferably the fragments are 50 mesh or smaller.

The piston 11 may be heated by any suitable means to the molding temperature. It is desirable, however, that the heating be as uniform as possible so that a substantially uniform heat flow from the piston into the mix will occur. For this purpose electrical resistance heating of the piston 11 is well suited to achieving a uniform piston temperature and a rapid heating cycle. Thus the piston may be inserted between the platens of a hydraulic press and a suitable electrical current may be passed between the platens and axially through the piston. The hydraulic press in this case affords good electrical contact. If desired, other forms of piston heating may be used, e.g., an induction heating arrangement.

The piston 11 may be made from any suitable metal which will not tend to leave metal particles deposited on the surface of the molded green carbon cup. One suitable material for this purpose is a hardened tool steel. The mold may be made of the same material although a steel mold with an aluminum oxide liner has been found desirable.

In making battery cups for very small cells, e.g., size AA, the heat in the piston may be insufficient to transfer enough heat to the mix to form a green carbon. Stated in another way, the mass of the piston may be too small compared to the piston surface transferring heat to the mix for adequate heating. This problem cannot be overcome by raising the piston temperature about 700° F. because the surface temperature of the piston would then tend to burn the pitch in the mix.

To overcome this problem it has been found desirable to use a heated mold rather than a heated piston. The mold is heated to a suitable temperature, which will be in the range of the piston temperatures referred to above. The mold heating is preferably effected by passing an electrical current therethrough as described above in connection with heating the piston. The mix may be charged in the mold either before or after the mold is heated, but preferably before. The piston is inserted in the charged, heated mold and the molding pressure is applied as described above in connection with the heated plunger. After the molding pressure is released the mold, piston and cup are cooled, the piston and cup are removed from the mold and the cup is ejected from the piston, as described above.

The mold mass, and hence its heat capacity, can be increased to any desired value by adjusting the mold wall thickness. For a size AA cell having a cup wall thickness of 0.025", a cup center rod diameter of 0.1" and a mix weight of 4 grams, a hardened tool steel mold wall thickness of 3/8" was found satisfactory.

While heat may be conducted to the mix by separately heating the mold and piston, in general the economic problem involved in separately heating both elements will make this undesirable.

In making cells of size D or larger it has been found preferable to heat the piston. In making cells of size AA or smaller it has been found preferable to heat the mold. For cells between these sizes, either form of the method can be used.

While the invention has been described in connection with specific embodiments thereof and in a specific use, various modifications thereof will occur to those skilled in the art without departing from the spirit and scope of the invention as set forth in the appended claims.

What is claimed is:

1. The method of molding a thin-walled green carbon cup having a closed and an open end, comprising the steps of:

(a) charging a quantity of carbonaceous molding powder into a hollow mold element closed at one end and open at the other end, said mold element having an internal configuration and dimensions corresponding to the external configuration and dimensions of said cup;
(b) inserting a piston element into said mold element and into contact wtih said powder therein, said piston element having an external configuration and dimensions corresponding to the internal configuration and dimensions of said cup;
(c) heating one of said elements prior to insertion of said piston element into said mold element to a temperature in the range of about 350° F. to 700° F. and sufficient for the heat content of said heated element, when transferred to said powder, to soften said powder for conversion thereof to a green carbon state, the other of said elements being essentially at room temperature when said piston element is inserted into said mold element;
(d) applying an external axial force to said piston element to cause the latter to apply a molding pressure to said powder and to cause the same to fill the space between said piston and mold elements;
(e) maintaining said piston element in contact with said powder and under a molding pressure for a sufficient time interval for said molding pressure and the heat transferred from said heated element to convert said powder to a green carbon state and in the shape of said cup;
(f) cooling said piston and mold elements and said cup molded therebetween; and
(g) separating said piston and mold elements and removing said cooled cup therefrom.

2. The method set forth in claim 1 in which said external axial force produces a pressure on said powder lying in the range of about 10,000 to 50,000 p.s.i.

3. The method set forth in claim 1 in which said temperature of said heated element is approximately 500° F. and in which said external axial force produces a pressure on said powder of approximately 15,000 p.s.i.

4. The method set forth in claim 1 in which molding pressure is maintained on said powder for a time interval of about 20 to 30 seconds.

5. The method set forth in claim 1 in which said heated element is said piston.

6. The method set forth in claim 1 in which said heated element is said mold.

7. The method of molding a thin-walled green carbon cup having a closed end and a central rod projecting upwardly from said closed end, comprising the steps of:
(a) charging a quantity of carbonaceous molding powder into a hollow mold closed at one end and open at the other end, said mold having an internal configuration and dimensions corresponding to the external configuration and dimensions of said cup;
(b) inserting a piston having a central annular space open at the bottom into said mold and into contact with said powder therein, said piston having an external configuration and dimensions corresponding to the internal configuration and dimensions of said cup, said mold being essentially at room temperature when said piston element is inserted into said mold element;
(c) passing an electrical current through said piston immediately prior to insertion thereof into said mold to heat said piston to a temperature lying in the range of about 350° F. to 700° F. and sufficient for the heat content of said heated piston when transferred to said powder to soften said powder for conversion thereof to a green carbon state;
(d) immediately applying an external axial force to said piston to cause the latter to apply a molding pressure to said powder and to cause the same to fill the space between said piston and mold elements and said central annular space in said piston;
(e) maintaining said piston element in contact with said powder and under a molding pressure for a sufficient time interval for said molding pressure and the heat transferred from said heated element to said powder to convert said powder to a green carbon state and in the shape of said cup;
(f) cooling said piston and mold elements and said cup molded therebetween; and
(g) separating said piston and mold elements and removing said cooled cup therefrom.

References Cited
UNITED STATES PATENTS

| | | | |
|---|---|---|---|
| 3,001,237 | 9/1961 | Balaguer | 264—27 |
| 3,092,437 | 6/1963 | Carter et al. | 264—29 |
| 3,212,937 | 10/1965 | Thlvenheimo | 136—122 |

WINSTON A. DOUGLAS, *Primary Examiner.*

A. SKAPARS, *Assistant Examiner.*